(12) United States Patent
Patwardhan et al.

(10) Patent No.: US 10,324,805 B1
(45) Date of Patent: Jun. 18, 2019

(54) TARGETED CHUNKING OF DATA

(71) Applicant: EMC IP Holding Company LLC, Hopkinton, MA (US)

(72) Inventors: Kedar Patwardhan, Irvine, CA (US); Mangesh Nijasure, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 369 days.

(21) Appl. No.: 15/283,538

(22) Filed: Oct. 3, 2016

(51) Int. Cl.
*G06F 7/00* (2006.01)
*G06F 17/00* (2019.01)
*G06F 11/14* (2006.01)

(52) U.S. Cl.
CPC .................. *G06F 11/1451* (2013.01)

(58) Field of Classification Search
CPC .... G06F 11/1451; G06F 3/061; G06F 3/0656; G06F 3/0679; G06F 3/0619; G06F 3/0659; G06F 3/0689
See application file for complete search history.

(56) References Cited

U.S. PATENT DOCUMENTS

| | | | | |
|---|---|---|---|---|
| 7,779,021 B1* | 8/2010 | Smith | ................. | G06F 11/3438 707/760 |
| 2008/0159331 A1* | 7/2008 | Mace | ..................... | H04L 47/10 370/473 |
| 2009/0077252 A1* | 3/2009 | Abdo | .................. | H03M 7/3084 709/231 |

* cited by examiner

*Primary Examiner* — Azam M Cheema
(74) *Attorney, Agent, or Firm* — Dergosits & Noah LLP; Todd A. Noah

(57) ABSTRACT

Targeted chunking of data is described. A system identifies a length of a sliding window that a data chunking routine applies to a data buffer to create data chunks. The system identifies an expected chunk boundary in the data buffer. The system adjusts the expected chunk boundary, based on the length of the sliding window. The system enables the data chunking routine to start applying the sliding window at the adjusted expected chunk boundary in the data buffer instead of starting application of the sliding window at a beginning of the data buffer.

17 Claims, 5 Drawing Sheets

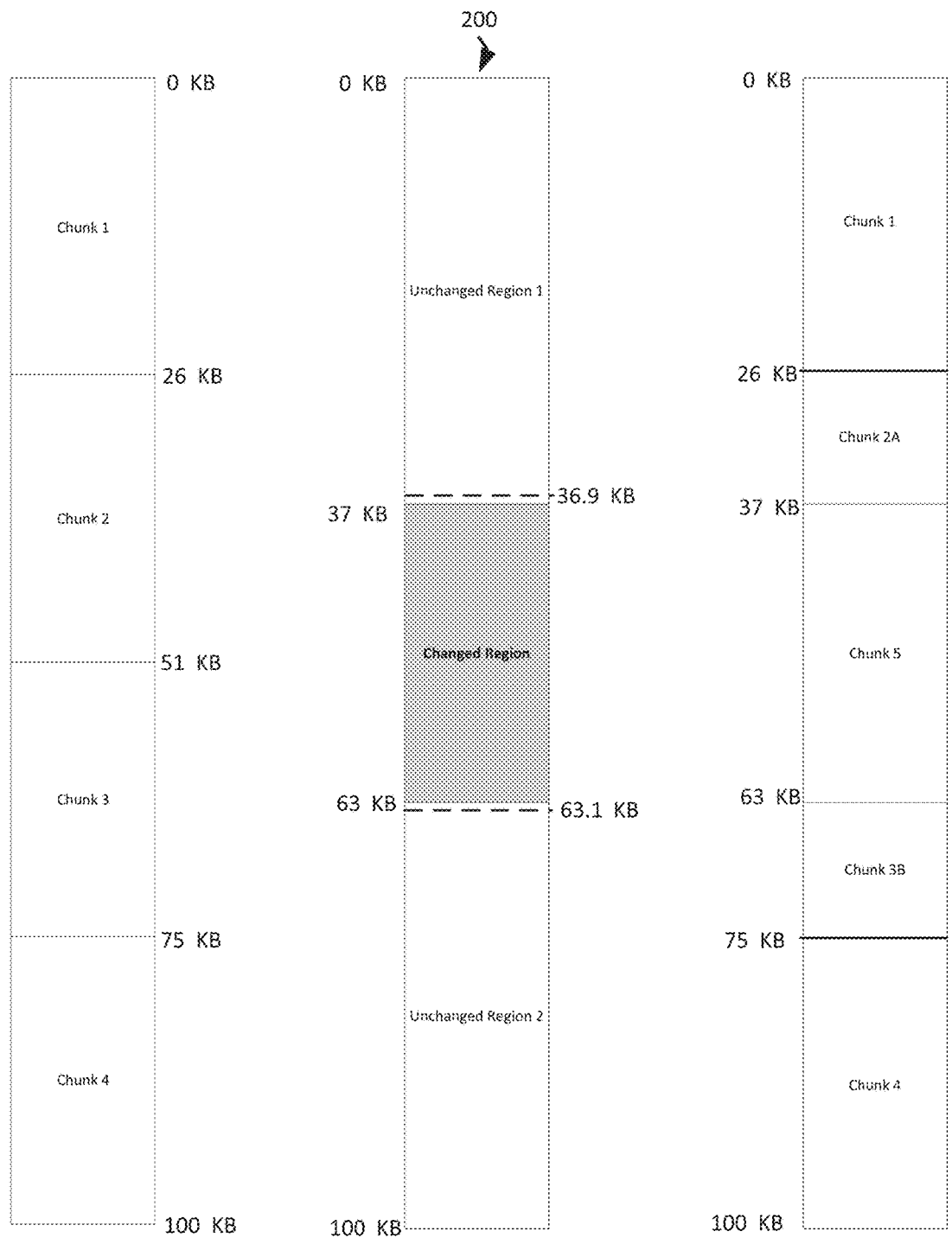

TARGETED CHUNKING OF DATA

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object. When a backup/restore application creates an incremental backup file for a data object, the backup/restore application only backs up data that is new or changed in the data object since the backup/restore application created the most recent previous backup file. The backup/restore application identifies the most recently created backup file to enable the combination of the incremental backup file and the most recently created backup file, possibly along with other backup files created for the data object, into a full copy of the backed up data object.

De-duplicating can be a specialized data compression process for eliminating most identical copies of repeating data. In the deduplication process, unique chunks of data are identified and stored during analysis. As the analysis continues, other data chunks are compared to the already stored data chunks, and whenever a match occurs, the redundant data chunk is replaced with a small reference that points to the matching data chunk that is already stored. Given that the deduplication process may identify the same unique data chunk dozens, hundreds, or even thousands of times, the amount of data that needs to be stored can be greatly reduced. In some systems, data chunks are defined by physical layer constraints, while in other systems only complete files are compared, which is called single-instance storage. A data chunking routine can be an algorithm that passes a sliding window along data to identify more naturally occurring internal data boundaries. A sliding window can be a fixed length queue in which the oldest, or first, data entering the queue is processed first, and may be referred to as a first-in first-out queue.

A data object can be a collection or a group of information that is backed up as a unit, such as the information for a computer or a network of computers. A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

BRIEF DESCRIPTION OF THE DRAWINGS

FIGS. 2 A-C illustrate block diagrams of example data structures for targeted chunking of data, under an embodiment;

DETAILED DESCRIPTION

Figure 1:
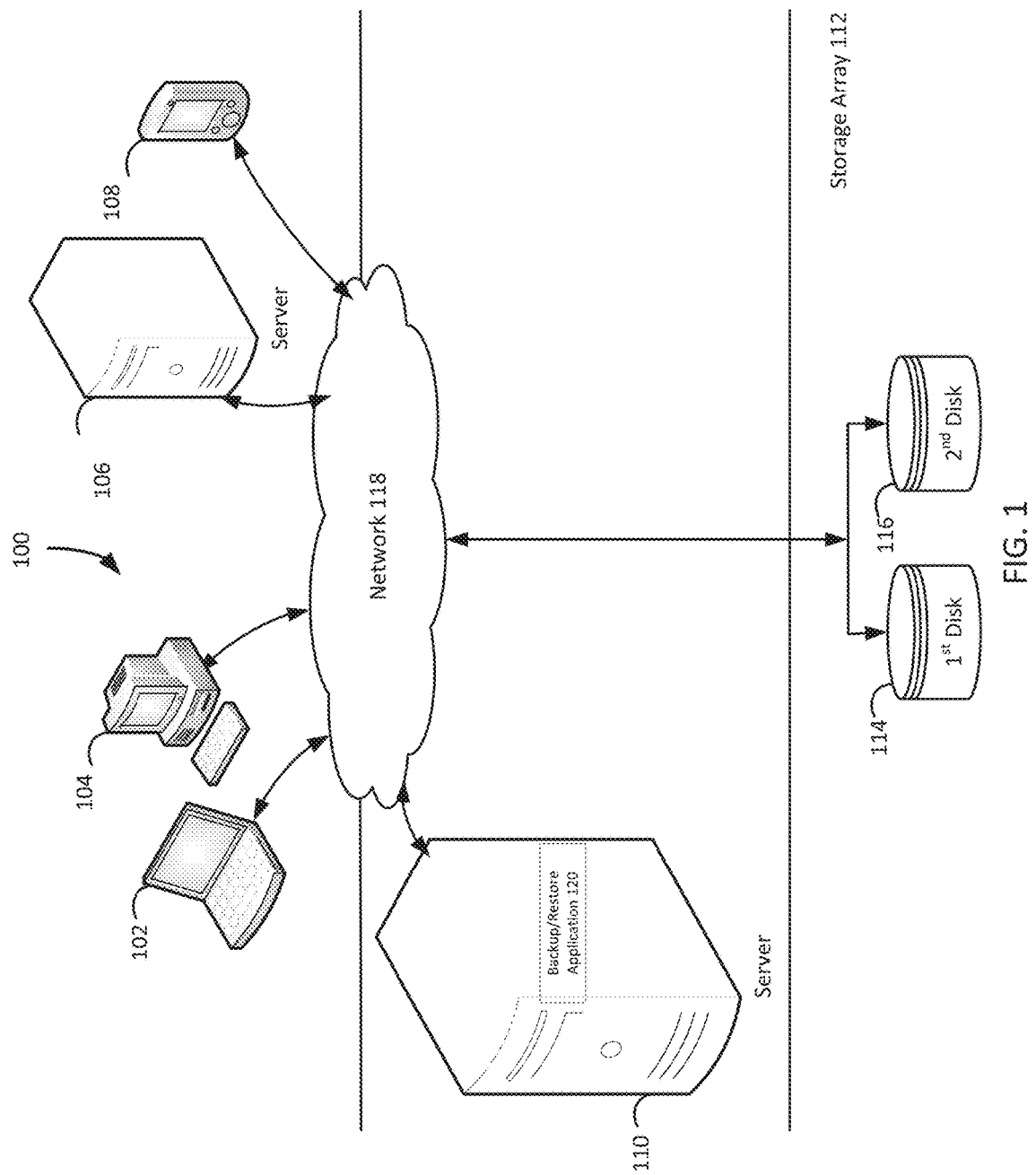
FIG. 1 illustrates a block diagram of an example system for targeted chunking of data, under an embodiment.

A typical backup/restore application processes all of the data in a data object to generate variable length data chunks every time that a backup file is created for the data object. The typical backup/restore application reads data from the data object, stores the data in a buffer, and makes the data available to a data chunking routine's sliding window. The data chunking routine adds a new data byte to the sliding window, computes a rolling checksum for the data bytes currently in the sliding window, and pushes the oldest data byte out of a sliding window that is filled with data bytes to prepare to read a new data byte from the buffer. After computing each rolling checksum, the data chunking routine determines whether or not to mark a new data chunk boundary to create a data chunk, based on the internal state maintained over the data bytes spanning the length of sliding window. Then the data chunking routine reads the next data byte from the buffer, and repeats these processes until all of the data in the data object is divided into data chunks.

Then the typical backup/restore application applies a hash function to each data chunk, thereby generating a corresponding hash value that uniquely identifies each data chunk. The backup/restore application stores the data chunks and their hash values for comparison with subsequently generated hash values for subsequently created data chunks. An end user subsequently changes the data object through a user application. When the next backup file is created for the data object, the typical backup/restore application executes the same processes again, processing all of the data in the data object to generate variable length data chunks. When the backup/restore application applies the data chunking method to the unchanged part of the data object, the data chunking method creates data chunks that are identical to previously created data chunks. When the backup/restore application applies the data chunking method to the changed part of the data object, the data chunking method creates new data chunks that differ from the previously created data chunks. The de-duplication process is based on storing only the new data chunks for the new backup file. Consequently, the time required to process all of the data in the data object has a significant impact on total time required to create a backup file, specifically the time required to compute the rolling checksum every time after reading each data byte that is in the data object. This checksum computation time increases linearly with the increase in size of the data object, and significantly increases the total time required to chunk the data object.

Embodiments herein provide targeted chunking of data. A system identifies a length of a sliding window that a data chunking routine applies to a data buffer to create data chunks. The system identifies an expected chunk boundary in the data buffer. The system adjusts the expected chunk boundary, based on the length of the sliding window. The system enables the data chunking routine to start applying the sliding window at the adjusted expected chunk boundary in the data buffer instead of starting application of the sliding window at a beginning of the data buffer.

For example, a backup/restore application identifies that a data chunking routine applies a 100 byte sliding window to a data buffer to create data chunks. The backup/restore application identifies that data change tracking indicates that data changed in a database beginning at a 37 KB offset from the beginning of the database. The backup/restore application adjusts the 37 KB offset by subtracting the length of the 100 byte sliding window to create an adjusted 36.9 KB offset. The backup/restore application instructs the data chunking routine to start applying the 100 byte sliding window at the 36.9 KB offset in the data buffer for the database instead of starting application of the 100 byte sliding window at the 0 KB beginning of the data buffer. The backup/restore application enables the data chunking routine to avoid the unnecessary processing of the first 36.9 KB in the data buffer, thereby resulting in a significant savings of the total time required to chunk the data in the data buffer.

FIG. 1 illustrates a diagram of a system 100 for targeted chunking of data, under an embodiment. As shown in FIG. 1, the system 100 may illustrate a cloud computing environment in which data, applications, services, and other resources are stored and delivered through shared datacenters and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, a third client 106, and a fourth client 108; and a server 110, and a storage array 112 that may be provided by a hosting company. Although FIG. 1 depicts the first client 102 as a laptop computer 102, the second client 104 as a personal computer 104, the third client 106 as a server 106, and the fourth client 108 as a personal digital assistant 108, each of the clients 102-108 may be any type of computer. The storage array 112 includes a first disk 114 and a second disk 116. The clients 102-108, the server 110, and the storage array 112 communicate via a network 118. Although FIG. 1 depicts the system 100 with four clients 102-108, one server 110, one storage array 112, two disks 114-116, and one network 118, the system 100 may include any number of clients 102-108, any number of servers 110, any number of storage arrays 112, any number of disks 114-116, and any number of networks 118. The clients 102-108 and the server 110 may each be substantially similar to the system 500 depicted in FIG. 5 and described below.

The server 110, which may be referred to as a backup server 110, includes a backup/restore application 120 that may create backup files of data objects for the clients 102-108, and execute a rollback based on the backup files stored on the storage array 112, which may be stored using the VHDx format for Microsoft Windows®. The backup/restore application 120 may provide centralized administration, such as scheduling, monitoring, and managing backup operations and backup files. The backup/restore application 120 can enable the storing of backup operation schedules, client policies, and client configurations. The backup/restore application 120 may provide a unique interface to the clients 102-108 during login, and assist the backup server 110 in authenticating and registering the clients 102-108. The backup/restore application 120 can send backup/restore work orders to the clients 102-108, which may receive and process the work orders to start a backup or restore operation. The backup/restore application 120 maintains a local database of all processes that execute on the backup server 110. The backup/restore application 120 executes server-side processes for a system administrator's graphical management console, which may enable the system administrator to use command line interface tools for queries. For example, a system administrator identifies the clients 102-108 registered with the backup server 110.

Although FIG. 1 depicts the backup/restore application 120 residing completely on the backup server 110, the backup/restore application 120 may reside in any combination of partially on the backup server 110 and partially on the clients 102-108, such as by residing as data management applications on the clients 102-108. Even though the following paragraphs describe EMC Corporation's Avamar® backup/restore application and EMC Corporation's NetWorker® backup/restore application as examples of the backup/restore application 120, the backup/restore application 120 may be any other backup/restore application which provides the backup/restore functionalities described in the Background section.

The backup/restore application 120 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 120 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The system 100 identifies a length of a sliding window that a data chunking routine applies to a data buffer to create data chunks. The system 100 creates data chunks based on a different beginning point in the data buffer, with the beginning point adjusted by the length of the sliding window. For example and without limitation, this can include the backup/restore application 120 identifying that a data chunking routine applies a 100 byte sliding window to a data buffer to create data chunks. A data chunking routine's sliding window may be considered as converting the data chunking algorithm into a finite impulse response function, to borrow terminology from signal processing. A specific data byte enters the input end of the sliding window, and with each new data byte added to the input end of sliding window, the specific data byte moves towards output end of the sliding window, eventually exiting the sliding window. If the length of sliding window is S bytes, during this course of traversal of the specific data byte from the input end to the output end of the sliding window, the data chunking routine processes S bytes. Thus, the mutations to the internal state of the data chunking routine are limited to the length of the sliding-window, which is S bytes.

Any decision about marking a chunk boundary based on this internal state is limited to the mutations caused by a data length that is equal to the size of sliding window, or S bytes. In other words, instead of processing each data byte in the data buffer, the data chunking routine needs to process only a sliding-window-length of data bytes located ahead of an expected chunk boundary to create a proper data chunk that will happen to match an already existing data chunk created during the previous backup. Due to finite impulse response of the data chunking routine, once the data buffer has consumed data bytes equal to length of the sliding window, any more data fed to the data chunking routine does not have any impact on the output. Thus, it is not necessary to process the entire data buffer. A data buffer can be a region of a physical memory storage used to temporarily store information. A data chunk can be a contiguous section of information.

In addition to identifying the length of the sliding window, the system 100 identifies an expected chunk boundary in the data buffer. The system 100 creates data chunks based on the expected chunk boundary and the length of the sliding window. By way of example and without limitation, this can include the backup/restore application 120 identifying that data change tracking indicates that the data which changed in a database begins at the 37 KB offset from the beginning of the database, as depicted in FIG. 2B and described below in reference to FIG. 2B. Data change tracking can be based on changed-block-tracking, a list of changed files, a list of exact changes in the form of sub-file modified regions, or some other record of modifications. The system 100 can identify an expected chunk boundary in the data buffer without the use of data change tracking, as described below in reference to FIGS. 3 A-C. An expected data chunk boundary can be an anticipated or calculated location that divides sections of contiguous information.

After both the length of the sliding window and the expected chunk boundary are identified, the system 100 adjusts the expected chunk boundary, based on the length of the sliding window. The system 100 creates data chunks based on the expected chunk boundary adjusted by the length of the sliding window. In embodiments, this can include the backup/restore application 120 adjusting the 37 KB offset by subtracting the length of the 100 byte sliding window to create an adjusted 36.9 KB offset. Adjusting an expected data chunk boundary based on the length of a sliding window can be using the size of a data queue to modify a location that divides sections of contiguous information.

Furthermore, the system 100 can also identify another expected chunk boundary in the data buffer. The system 100 can use the other expected chunk boundary to stop the chunking of data. For example and without limitation, this can include the backup/restore application 120 identifying that data change tracking indicates that the data which changed in a database ends at a 63 KB offset from the beginning of the database. Additionally, the system 100 can also adjust the other expected chunk boundary based on the length of the sliding window. The system 100 can use the length of the sliding window to adjust the other expected chunk boundary used to stop the chunking of data. By way of example and without limitation, this can include the backup/restore application 120 adjusting the 63 KB offset by adding the length of the 100 byte sliding window to create an adjusted 63.1 KB offset.

After computing the adjusted expected chunk boundary, the system 100 enables the data chunking routine to start applying the sliding window at the adjusted expected chunk boundary in the data buffer instead of starting application of the sliding window at a beginning of the data buffer. Therefore, the system 100 starts creating data chunks more efficiently than typical backup/restore applications start creating their data chunks. In embodiments, this can include the backup/restore application 120 instructing the data chunking routine to start applying the 100 byte sliding window at the 36.9 KB offset in the data buffer instead of starting application of the 100 byte sliding window at the 0 KB beginning of the data buffer. The backup/restore application 120 enables the data chunking routine to avoid the unnecessary processing of the first 36.9 KB in the data buffer, thereby resulting in a significant savings of the total time required o chunk the data in the data buffer. The system 100 can enable the data chunking routine to start applying the sliding window at the adjusted expected chunk boundary in the data buffer without the use of data change tracking, as described below in reference to FIGS. 3 A-C. Starting application of a sliding window at an adjusted expected chunk boundary in a data buffer can be initiating the use of a data queue at a location of an anticipated or calculated division of information into contiguous sections. The beginning of the data buffer can be the first location in an information structure.

Moreover, the system 100 can also enable the data chunking routine to stop applying the sliding window at the other adjusted expected chunk boundary in the data buffer instead of stopping application of the sliding window at the ending of the data buffer. Consequently, the system 100 stops creating data chunks more efficiently than typical backup/restore applications stop creating their data chunks. For example and without limitation, this can include the backup/restore application 120 instructing the data chunking routine to stop applying the 100 byte sliding window at the 63.1 KB offset in the data buffer instead of stopping application of the 100 byte sliding window at the 100 KB ending of the data buffer. The backup/restore application 120 enables the data chunking routine to avoid the unnecessary processing of the last 36.9 KB in the data buffer, thereby resulting in a significant savings of the total time required o chunk the data in the data buffer. The system 100 can enable the data chunking routine to stop applying the sliding window at the other adjusted expected chunk boundary in the data buffer without the use of data change tracking, as described below in reference to FIGS. 3 A-C. Stopping application of a sliding window at another adjusted expected chunk boundary in a data buffer can be halting the use of a data queue at a location of an anticipated or calculated division of information into contiguous sections. The ending of the data buffer can be the last location in an information structure.

FIGS. 2 A-C illustrate block diagrams of example data structures 200 for targeted chunking of data, under an embodiment. FIG. 2A depicts an example data chunk map that the backup/restore application 120 created after chunking a data buffer that stored a 100 KB database. The backup/restore application 120 identifies the location of chunk 1 from the 0 KB beginning of the data buffer to the 26 KB offset from the beginning of the data buffer, and the location of chunk 2 from the 26 KB offset from the beginning of the data buffer to the 51 KB offset from the beginning of the data buffer. The backup/restore application 120 also identifies the location of chunk 3 from the 51 KB offset from the beginning of the data buffer to the 75 KB offset from the beginning of the data buffer, and the location of chunk 4 from the 75 KB offset from the beginning of the data buffer to the 100 KB offset from the beginning of the data buffer. Additionally, the backup/restore application 120 applies a hash function to each of the chunks 1-4, thereby generating a corresponding hash value that uniquely identifies each of these chunks, and stores these chunks and their hash values for comparison with subsequently generated hash values for subsequently created chunks.

FIG. 2B depicts an example data buffer and example expected chunk boundaries. A database management system user modified the database from the 37 KB offset from the beginning of the data buffer to the 63 KB offset from the beginning of the data buffer. The backup/restore application 120 identifies that data change tracking indicates that the data which changed in the database begins at the 37 KB offset from the beginning of the database, and adjusts the 37 KB offset by subtracting the length of the 100 byte sliding window to create the adjusted 36.9 KB offset that is depicted in FIG. 2B. Then the backup/restore application 120 identifies that data change tracking indicates that the data which changed in the database ends at the 63 KB offset from the beginning of the database, and adjusts the 63 KB offset by adding the length of the 100 byte sliding window to create the adjusted 63.1 KB offset that is depicted in FIG. 2B. Next, the backup/restore application 120 instructs the data chunking routine to start applying the sliding window at the 36.9 KB offset in the data buffer and to stop applying the sliding window at the 63.1 KB offset in the data buffer. In contrast, a typical backup/restore application would have started application of the sliding window at the 0 KB beginning of the data buffer and stopped application of the sliding window at the 100 KB ending of the data buffer. The backup/restore application 120 enables the data chunking routine to avoid the unnecessary processing of the first 36.9 KB in the data buffer and the last 36.9 KB in the data buffer, thereby resulting in a significant savings of the total time required to chunk the data in the data buffer. In this example, the user changed 26% of the data in the database, and the backup/restore application 120 processed only 26.2% of the data in the database, whereas a typical backup/restore application would have processed 100% of the data in the database.

FIG. 2C depicts an example data chunk map that the backup/restore application 120 created after chunking a data buffer that stored the changed version of the 100 KB database. The backup/restore application 120 identifies the location of chunk 1 from the 0 KB beginning of the data buffer to the 26 KB offset from the beginning of the data buffer, and the location of chunk 2A from the 26 KB offset from the beginning of the data buffer to the 37 KB offset from the beginning of the data buffer. Chunk 2A may be referred to as an overlay chunk because it is the only part of the original chunk 2 that is required to restore the database to its post-change state. The backup/restore application 120 did not need to read most of the data corresponding to chunk 2. Reading the sliding window's length of data at the adjusted expected chunk boundary of 36.9 KB was sufficient to align the data chunking routine to have the same state as it had when processing the data buffer prior to the data change. Therefore, the data chunking routine could therefore correctly compute the new chunk boundary for the database without reading the data from the 0 KB beginning of the data buffer to the adjusted expected chunk boundary of 36.9 KB.

The backup/restore application 120 also identifies the location of new chunk 5 from the 37 KB offset from the beginning of the data buffer to the 63 KB offset from the beginning of the data buffer. The backup/restore application 120 additionally identifies the location of chunk 3B from the 63 KB offset from the beginning of the data buffer to the 75 KB offset from the beginning of the data buffer, and the location of chunk 4 from the 75 KB offset from the beginning of the data buffer to the 100 KB offset from the beginning of the data buffer. Chunk 3B may be referred to as an overlay chunk because it is the only part of the original chunk 3 that is required to restore the database to its post-change state. The backup/restore application 120 did not need to read most of the data corresponding to chunk 3. Reading the sliding window's length of data to the other adjusted expected chunk boundary of 63.1 KB was sufficient to align the data chunking routine to have the same state as it had when processing the data buffer prior to the data change. Therefore, the data chunking routine could therefore correctly compute the new chunk boundary for the database without reading the data from the other adjusted expected chunk boundary of 63.1 KB to the 100 KB ending of the data buffer.

Furthermore, the backup/restore application 120 which creates the incremental backup file that consists of chunk 5 only, is unaware of the chunk boundaries previously created by the data chunking routine. Processing the extra sliding window-length of data bytes at the starting and ending boundaries of the changed region are sufficient to enable the data chunking routine to have the same state as required when processing the changed region.

Figures 3A, 3B, 3C:
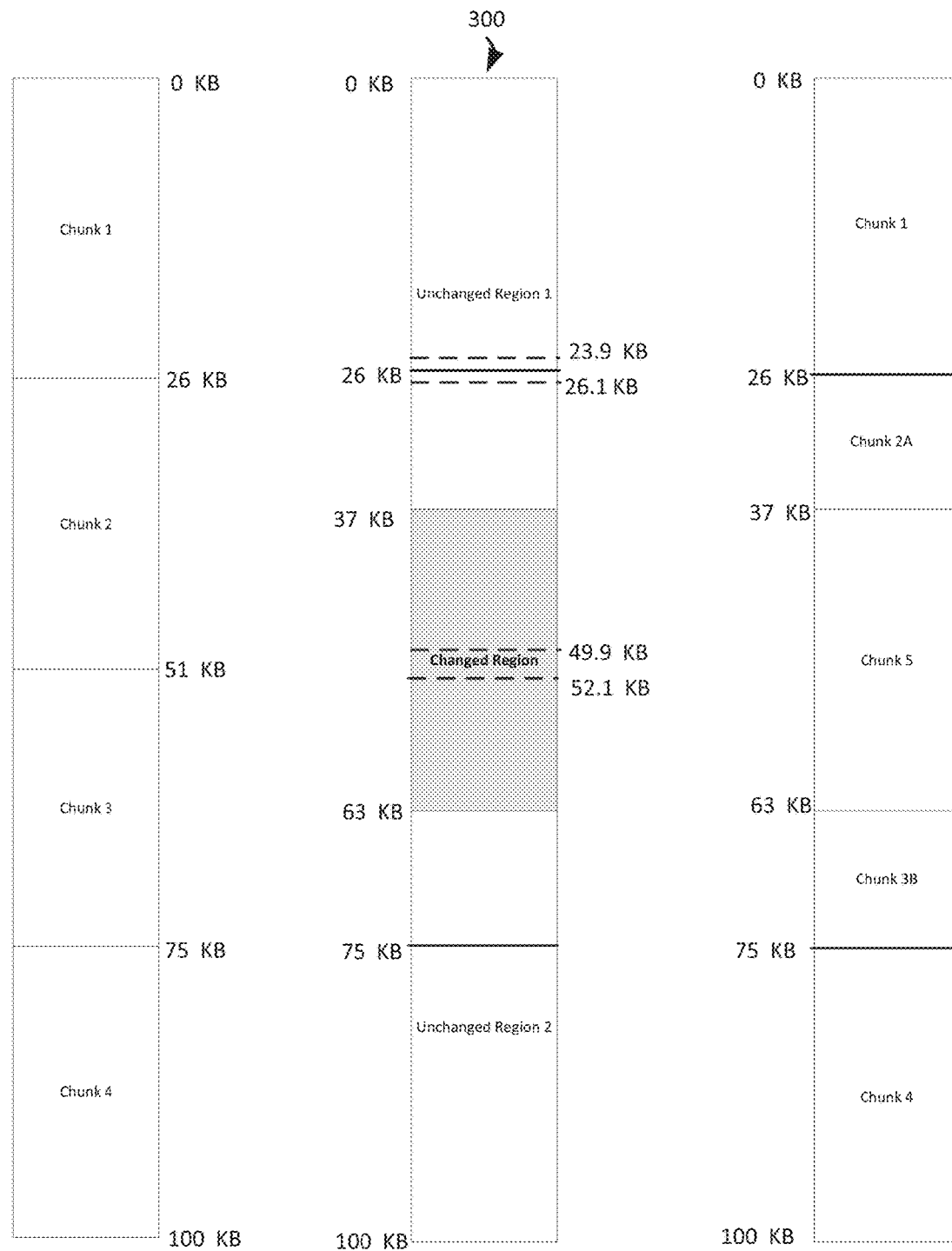
FIGS. 3 A-C illustrate block diagrams of other example data structures for targeted chunking of data, under an embodiment.

FIGS. 3 A-C illustrate block diagrams of other example data structures 300 for targeted chunking of data, under an embodiment. FIG. 3A is substantially similar to FIG. 2A, and FIG. 3C is substantially similar to FIG. 2C because the data chunk maps before and after the processing without the use of data change tracking remain the same.

FIG. 3B depicts an example data buffer and example expected chunk boundaries without the use of data change tracking. A database management system user modified the database from the 37 KB offset from the beginning of the data buffer to the 63 KB offset from the beginning of the data buffer. The backup/restore application 120 identifies that the previous average data chunk length is 25 KB, and varies from a minimum length of 24 KB to a maximum length of 26 KB. Although this example describes an expected chunk boundary that is based on an average data chunk length that varies between a minimum data chunk length and a maximum data chunk length, the expected chunk boundary may be based on other measures of data chunks, such as a median chunk length, and/or calculations of standard deviations and variances for data chunk lengths. Then the backup/restore application 120 adjusts the minimum length of 24 KB by subtracting the length of the 100 byte sliding window to create the adjusted minimum length of 23.9 KB. Next the backup/restore application 120 adjusts the maximum length of 26 KB by adding the length of the 100 byte sliding window to create the adjusted maximum length of 26.1 KB. Since the backup/restore application 120 is initiated with the 0 KB offset in the data buffer, the backup/restore application 120 instructs the data chunking routine to start applying the sliding window at the 23.9 KB offset in the data buffer and to stop applying the sliding window at the 26.1 KB offset in the data buffer, as depicted in FIG. 3B. In contrast, a typical backup/restore application would have started application of the sliding window at the 0 KB beginning of the data buffer and stopped application of the sliding window after the 100 KB offset to create all of the data chunks. The backup/restore application 120 enables the data chunking routine to avoid the unnecessary processing of the first 23.9 KB in the data buffer, thereby resulting in a significant savings of the total time required to chunk the data in the data buffer.

Next, the backup/restore application 120 adds the adjusted minimum length of 23.9 KB to the data chunk boundary established at the offset 26.0 to create the offset of 49.8, and adds the adjusted maximum length of 26.1 KB to the data chunk boundary established at the offset 26.0 to create the offset of 52.1, as depicted in FIG. 3B. Therefore, the backup/restore application 120 instructs the data chunking routine to start applying the sliding window at the 49.9 KB offset in the data buffer and to stop applying the sliding window at the 52.1 KB offset in the data buffer. When the data chunking routine applies the sliding window to the data in the buffer at the 49.9 offset, and computes a rolling checksum for the data bytes in the sliding window, the data chunking routine determines that the rolling checksum differs from the previously computed rolling checksum for chunk 2. This difference in rolling checksums enables the data chunking routine to identify the changed data in the changed region, which can cause the data chunking routine to return to the last matching chunk boundary at the 26.0 KB offset, and begin applying the sliding window at that location in the data buffer. Even if the data chunking routine may have to apply the sliding window to the data in the data buffer from the 26.0 KB offset to the 100 KB ending of the data buffer, the data chunking routine still avoided the unnecessary processing of the data in the data buffer from the 0 KB beginning of the data buffer to the 23.9 offset in the data buffer. Following the creation of the new data chunk, when the data chunking routine recreates a data chunk that matches a previously created data chunk, the data chunking routine may be able to return to the process of only reading data from the sliding window's length before an expected chunk boundary to the sliding window's length after an expected chunk boundary.

Figure 4:
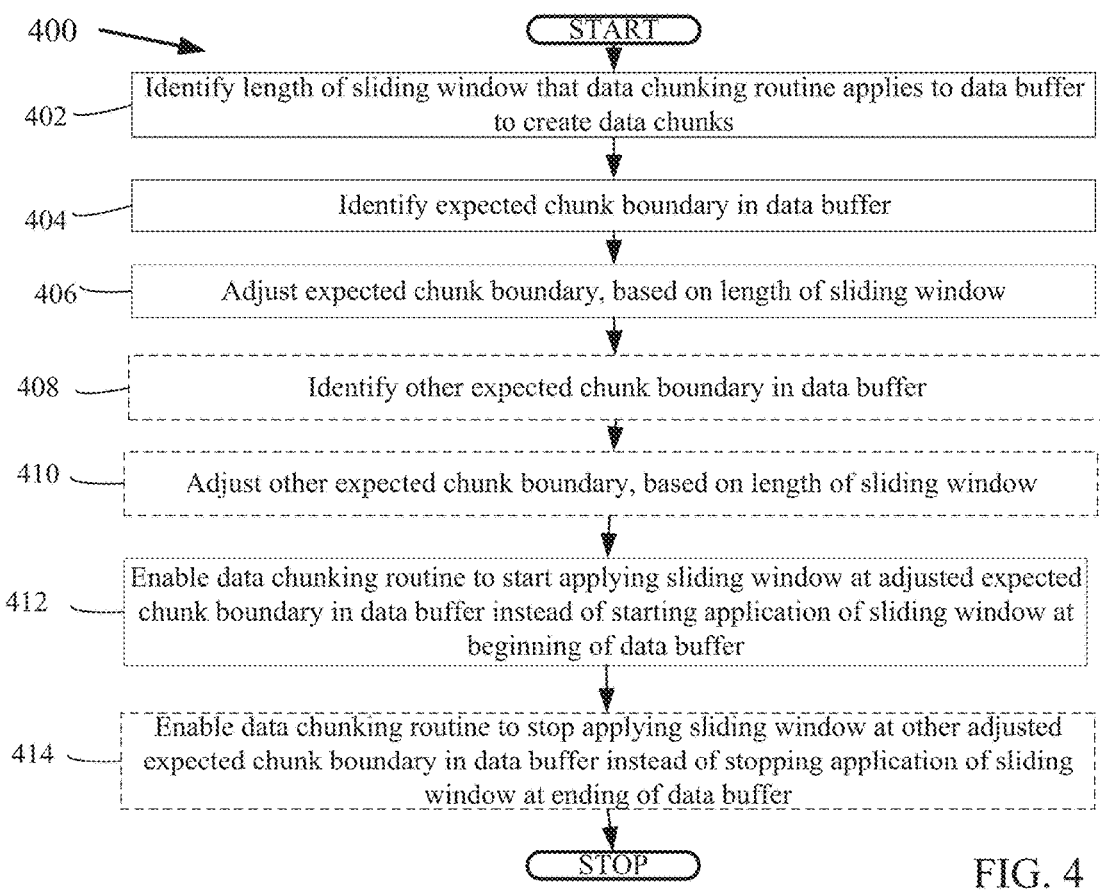
FIG. 4 is a flowchart that illustrates a method of targeted chunking of data, under an embodiment.

FIG. 4 is a flowchart that illustrates a method for targeted chunking of data, under an embodiment. Flowchart 400 illustrates method acts illustrated as flowchart blocks for certain steps involved in and/or between the clients 102-108 and/or the server 110 of FIG. 1 and also involving the data structures 200 of FIG. 2.

A length of a sliding window that a data chunking routine applies to a data buffer to create data chunks is identified, block 402. For example and without limitation, this can include the backup/restore application 120 identifying that a data chunking routine applies a 100 byte sliding window to a data buffer to create data chunks.

An expected chunk boundary in the data buffer is identified, block 404. By way of example and without limitation, this can include the backup/restore application 120 identifying that data change tracking indicates that the data which changed in a database begins at a 37 KB offset from the beginning of the database.

The expected chunk boundary is adjusted based on the length of the sliding window, block 406. In embodiments, this can include the backup/restore application 120 adjusting the 37 KB offset by subtracting the length of the 100 byte sliding window to create an adjusted 36.9 KB offset.

Another expected chunk boundary in the data buffer is optionally identified, block 408. For example and without limitation, this can include the backup/restore application 120 identifying that data change tracking indicates that the data which changed in the database ends at a 63 KB offset from the beginning of the database.

The other expected chunk boundary is optionally adjusted based on the length of the sliding window, block 410. By way of example and without limitation, this can include the backup/restore application 120 adjusting the 63 KB offset by adding the length of the 100 byte sliding window to create an adjusted 63.1 KB offset.

The data chunking routine is enabled to start applying the sliding window at the adjusted expected chunk boundary in the data buffer instead of starting application of the sliding window at a beginning of the data buffer, block 412. In embodiments, this can include the backup/restore application 120 instructing the data chunking routine to start applying the 100 byte sliding window at the 36.9 KB offset in the data buffer for the database instead of starting application of the 100 byte sliding window at the 0 KB beginning of the data buffer.

The data chunking routine is optionally enabled to stop applying the sliding window at the other adjusted expected chunk boundary in the data buffer instead of stopping application of the sliding window at the ending of the data buffer, block 414. For example and without limitation, this can include the backup/restore application 120 instructing the data chunking routine to stop applying the 100 byte sliding window at the 63.1 KB offset in the data buffer for the database instead of stopping application of the 100 byte sliding window at the 100 KB ending of the data buffer.

Although FIG. 4 depicts the blocks 402-414 occurring in a specific order, the blocks 402-414 may occur in another order. In other implementations, each of the blocks 402-414 may also be executed in combination with other blocks and/or some blocks may be divided into a different set of blocks.

Figure 5:
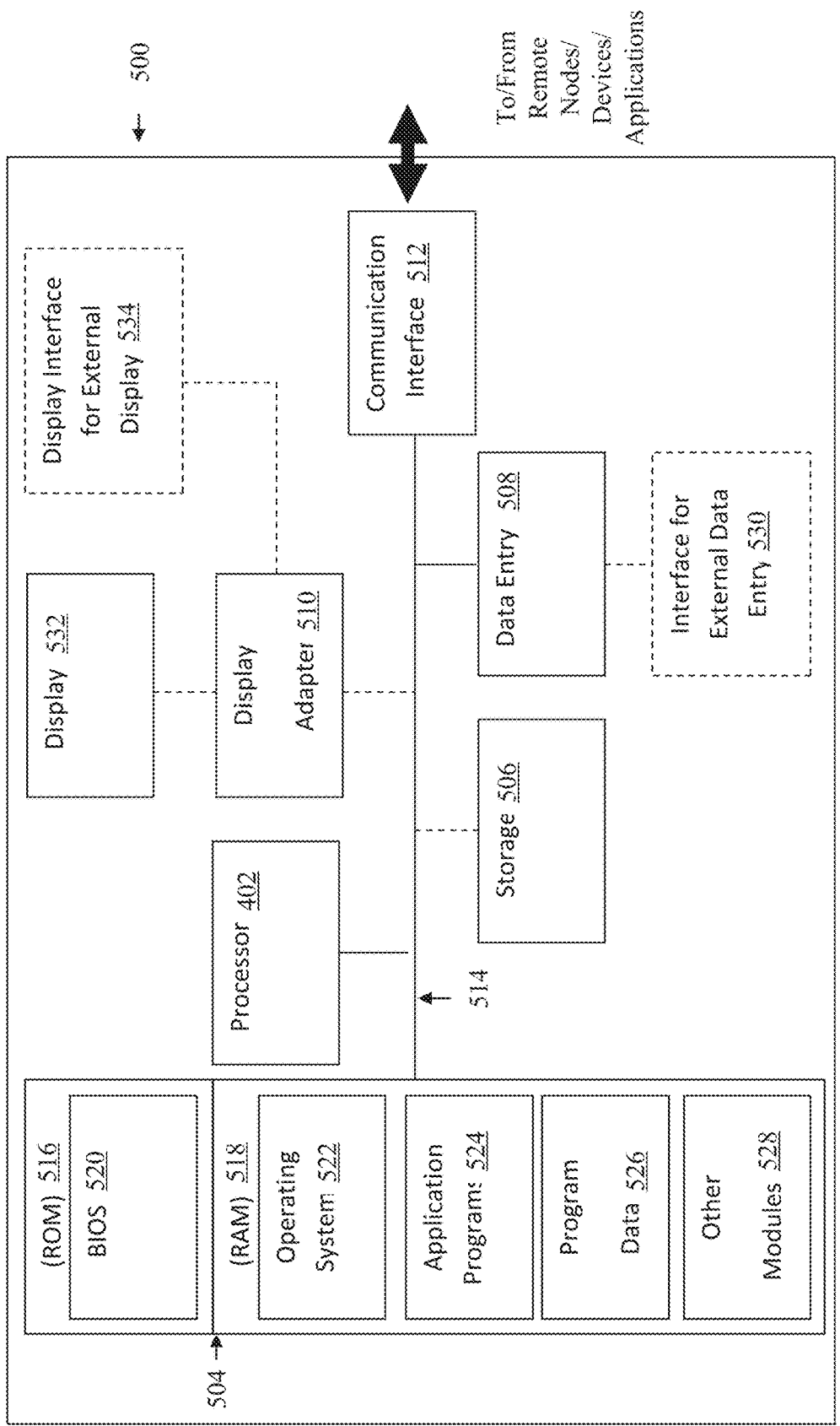
FIG. 5 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, memory 504, storage 506, a data entry module 508, a display adapter 510, a communication interface 512, and a bus 514 that couples the elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include read only memory (ROM) 516 and random access memory (RAM) 518. The memory 504 may be configured to store program instructions and data during operation of the hardware device 500. In various embodiments, the memory 504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user may enter commands and information into the hardware device 500 through the data entry module 508. The data entry module 508 may include mechanisms such as a keyboard, a touch screen, a pointing device, etc. Other external input devices (not shown) are connected to the hardware device 500 via an external data entry interface 530. By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via an external display interface 534. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for targeted chunking of data, the system comprising:
  a processor-based application, which when executed on a computer, will cause the processor to:
  identify a length of a sliding window that a data chunking routine applies to a data buffer to create data chunks;
  identify an expected chunk boundary in the data buffer;
  adjust the expected chunk boundary based on the length of the sliding window; and
  enable the data chunking routine to start applying the sliding window at the adjusted expected chunk boundary in the data buffer by inputting a data byte from the data buffer into an input end of the sliding window, computing a rolling checksum on data in the sliding window, and outputting another data byte from an output end of the sliding window.

2. The system of claim 1, wherein identifying the expected chunk boundary in the data buffer comprises identifying a beginning of a changed data region.

3. The system of claim 1, wherein identifying the expected chunk boundary in the data buffer is based on an average data chunk length that is adjusted for variation.

4. The system of claim 1, wherein the processor-based application further causes the processor to:
  identify another expected chunk boundary in the data buffer;
  adjust the other expected chunk boundary based on the length of the sliding window; and
  enable the data chunking routine to stop applying the sliding window at the other adjusted expected chunk boundary in the data buffer.

5. The system of claim 1, wherein identifying the other expected chunk boundary in the data buffer comprises identifying an ending of a changed data region.

6. The system of claim 4, wherein identifying the other expected chunk boundary in the data buffer is based on an average data chunk length that is adjusted for variation.

7. A computer-implemented method for targeted chunking of data, the method comprising:
  identifying a length of a sliding window that a data chunking routine applies to a data buffer to create data chunks;
  identifying an expected chunk boundary in the data buffer;
  adjusting the expected chunk boundary based on the length of the sliding window; and
  enabling the data chunking routine to start applying the sliding window at the adjusted expected chunk boundary in the data buffer by inputting a data byte from the data buffer into an input end of the sliding window, computing a rolling checksum on data in the sliding window, and outputting another data byte from an output end of the sliding window.

8. The method of claim 7, wherein identifying the expected chunk boundary in the data buffer comprises identifying a beginning of a changed data region.

9. The method of claim 7, wherein identifying the expected chunk boundary in the data buffer is based on an average data chunk length that is adjusted for variation.

10. The method of claim 7, wherein the method further comprises:
  identifying another expected chunk boundary in the data buffer;
  adjusting the other expected chunk boundary based on the length of the sliding window; and
  enabling the data chunking routine to stop applying the sliding window at the other adjusted expected chunk boundary in the data buffer instead of stopping application of the sliding window at an ending of the data buffer.

11. The method of claim 10, wherein identifying the other expected chunk boundary in the data buffer comprises identifying an ending of a changed data region.

12. The method of claim 10, wherein identifying the other expected chunk boundary in the data buffer is based on an average data chunk length that is adjusted for variation.

13. A computer program product, comprising a non-transitory computer-readable medium having a computer-readable program code embodied therein to be executed by one or more processors, the program code including instructions to:
- identify a length of a sliding window that a data chunking routine applies to a data buffer to create data chunks;
- identify an expected chunk boundary in the data buffer;
- adjust the expected chunk boundary, based on the length of the sliding window; and
- enable the data chunking routine to start applying the sliding window at the adjusted expected chunk boundary in the data buffer by inputting a data byte from the data buffer into an input end of the sliding window, computing a rolling checksum on data in the sliding window, and outputting another data byte from an output end of the sliding window.

14. The computer program product of claim 13, wherein identifying the expected chunk boundary in the data buffer comprises identifying a beginning of a changed data region.

15. The computer program product of claim 13, wherein identifying the expected chunk boundary in the data buffer is based on an average data chunk length that is adjusted for variation.

16. The computer program product of claim 13, wherein the program code includes further instructions to:
- identify another expected chunk boundary in the data buffer;
- adjust the other expected chunk boundary, based on the length of the sliding window; and
- enable the data chunking routine to stop applying the sliding window at the other adjusted expected chunk boundary in the data buffer.

17. The computer program product of claim 16, wherein identifying the other expected chunk boundary in the data buffer one of comprises identifying an ending of a changed data region and is based on an average data chunk length that is adjusted for variation.

* * * * *